United States Patent Office 3,631,205
Patented Dec. 28, 1971

1

3,631,205
SULFONYL UREA DERIVATIVES
Albert J. Frey, Essex Fells, N.J., assignor to
Sandoz Inc., Hanover, N.J.
No Drawing. Filed Dec. 15, 1966, Ser. No. 601,871
Int. Cl. C07c 127/00
U.S. Cl. 260—553 DA     5 Claims

ABSTRACT OF THE DISCLOSURE

The compounds are derivatives of benzenesulfonyl urea having the structural formula

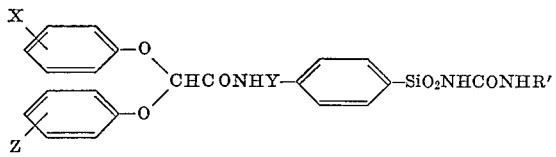

and the non-toxic basic salts thereof, wherein

X and Z are each, independently, hydrogen or halo;
Y represents alkylene having from 1 to 3 carbon atoms;
R' represents hydrogen, lower alkyl, lower alkenyl, lower alkylthio, cycloalkyl having from 5 to 8 ring carbon atoms, lower alkylcycloalkyl having from 5 to 8 ring carbon atoms, benzyl, phenyl (lower) alkyl, lower alkylphenyl or cycloalkyl (lower) alkyl having from 5 to 8 ring carbon atoms.

The compounds are useful as hypoglycemic agents, e.g., 1-[p - {2 - [α,α - bis(p - chlorophenoxy)acetamido]ethyl} phenylsulfonyl]-3-cyclohexylurea.

---

This invention relates to benzenesulfonyl urea derivatives. In particular, the invention pertains to 1-[p-{ω-[α,α-bis(p - chlorophenoxy)acetamido]alkyl}phenylsulfonyl]-3-substituted ureas. The invention also relates to intermediates which are useful in preparing the above compounds.

A great number of benzenesulfonyl urea derivatives having hypoglycemic activity have been described in the literature. Many of such compounds have the structural formula

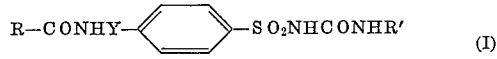

wherein:

Y represents alkylene having from 1 to 3 carbon atoms;
R represents alkyl, alkenyl, phenyl, substituted phenyl, thiophenyl, substituted thiophenyl, thienyl, substituted thienyl, furyl, substituted furyl, diphenylethyl, cycloalkyl or substituted cycloalkyl; and
R' represents hydrogen, lower alkyl, lower alkenyl, lower alkylthio, cycloalkyl having from 5 to 8 ring carbon atoms, lower alkylcycloalkyl having from 5 to 8 ring carbon atoms, benzyl, phenyl(lower)alkyl, lower alkylphenyl or cycloalkyl(lower)alkyl having from 5 to 8 ring carbon atoms.

The compounds of the present invention differ from the above compounds only with respect to the substituent R and may be represented structurally as follows:

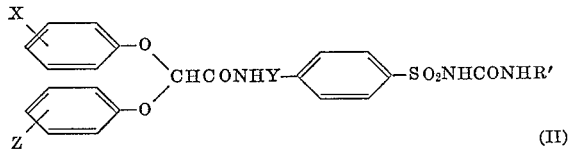

2 wherein the Y and R' substituents are the same as mentioned above for the known class of benzenesulfonyl urea derivatives of Formula I and X and Z are each, independently, hydrogen or halo, preferably having an atomic weight of from 35 to 80, i.e. bromo or chloro.

The essence of the present invention thus resides solely in the particular substituent constituting the R-group of the known class of compounds represented by Formula I. The remaining substituents (Y and R') can be varied in the manner heretofore described in the prior art and illustrated hereinabove.

The preferred compounds of the invention are those of structural Formula II wherein X and Z are both chloro and are in the paraposition, Y is ethylene and R' is either lower alkyl, cycloalkyl, having from 5 to 8 ring carbon atoms, or lower alkylcycloalkyl, having from 5 to 8 ring carbon atoms. As representative of such compounds, there may be mentioned the following:

1-[p-{2-[α,α-bis(p-chlorophenoxy)acetamido]ethyl} phenylsulfonyl]-3-methylurea.
1-[p-{2-[α,α-bis(p-chlorophenoxy)acetamido]ethyl} phenylsulfonyl]-3-ethylurea.
1-[p-{2-[α,α-bis(p-chlorophenoxy)acetamido]ethyl} phenylsulfonyl]-3-propylurea.
1-[p-{2-[α,α-bis(p-chlorophenoxy)acetamido]ethyl} phenylsulfonyl]-3-butylurea.
1-[p-{2-[α,α-bis(p-chlorophenoxy)acetamido]ethyl} phenylsulfonyl]-3-cyclohexylurea.
1-[p-{2-[α,α-bis(p-chlorophenoxy)acetamido]ethyl} phenylsulfonyl]-3-cyclooctylurea.
1-[p-{2-[α,α-bis(p-chlorophenoxy)acetamido]ethyl} phenylsulfonyl]-3-(4-methylcyclohexyl)urea.

The compounds of structural Formula II can be prepared from available materials by a variety of methods known in the art. Thus, for example, the compounds may be prepared by reacting the p-(ω-amino-alkyl)benzenesulfonamide with an appropriate bis-(phenoxy)acetyl halide or bis-(phenoxy)acetic acid alkyl ester to form the corresponding p-{ω-[α,α-bis(phenoxy)acetamido]alkyl} benzenesulfonamide and treating the latter with an appropriate isocyanate. These processes may be illustrated as follows:

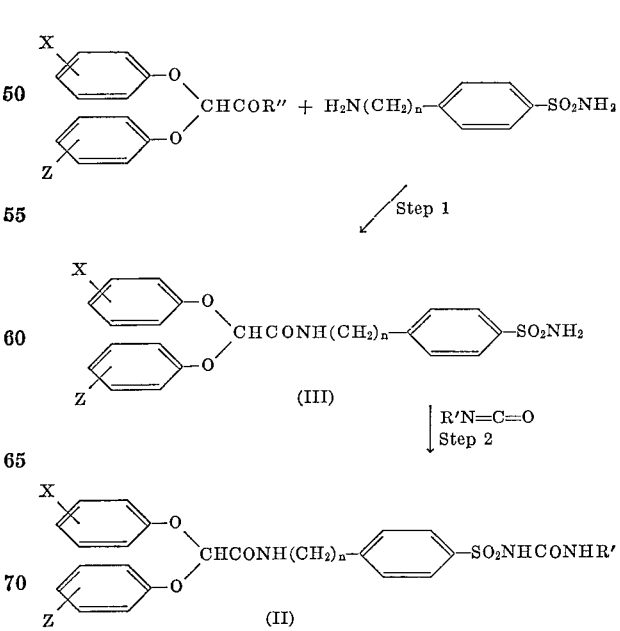

Wherein X, Z and R' are as defined above, R" represents halo, preferably bromo or chloro, or alkoxy, preferably lower alkoxy, and n represents a positive whole number of from 1 to 3, inclusive.

The reaction conditions for carrying out step 1 of the process will vary somewhat depending on whether an acetyl halide (R"=halo) or acetic acid ester (R"=alkoxy) is employed as a reactant. Where an acetyl halide is employed the reaction is generally carried out in a suitable inert organic solvent, e.g., chloroform, at room temperature or elevated temperatures and preferably in the presence of a suitable base to take up the liberated hydrogen halide, e.g., triethylamine. Where an acetic acid ester is employed the reaction is preferably carried out at an elevated temperature sufficient to distill off the alcohol formed during the reaction. The reaction may be carried out in an inert organic solvent, but the use of a solvent is generally not necessary.

In step 2 of the process, the sulfonamide (III), preferably in the form of a suitable alkali metal salt, e.g., the sodium or potassium salt, is reacted with an appropriately substituted isocyanate. The reaction is carried out in conventional manner preferably in an inert organic solvent, e.g., aqueous acetone, aqueous tetrahydrofuran and aqueous dioxane, and at room temperature (20–25° C.) or below.

Depending on the reaction conditions employed, the new compounds are obtained in the free form or in the form of their salts. The salts can be converted into the free compounds in conventional manner, for example by acidification. Similarly, the free compounds can be converted in conventional manner into their alkali metal and alkaline earth metal salts, e.g., the salts of sodium, potassium, calcium and magnesium.

Various of the reactants employed in the above process are known and can be prepared as described in the literature. Such others which may not be specifically described in the literature can be prepared from available materials in analogous manner or employing other well-known procedures.

The compounds of the present invention (Formula II) and their non-toxic basic salts represent a new group of sulfonyl ureas which possess pharmacological activity in animals. In particular, the compounds possess hypoglycemic activity thereby rendering them of value in the treatment of conditions characterized by an elevated blood sugar level. For such usage, the compounds may be admixed with a pharmaceutically acceptable carrier, and such other adjuvants as may be necessary, and administered orally in such forms as tablets, capsules, suspensions and the like or parenterally in the form of an injectable solution or suspension. The dosage administered will, of course, vary depending upon the compound employed and the mode of administration. However, in general, satisfactory results are obtained when administered at a daily dosage of from agout 50 milligrams to about 100 milligrams per kilogram of animal body weight preferably given in divided doses, 2 to 4 times a day, or in sustained release form. For most mammals the daily dosage is generally in the range of from about 250 milligrams to about 2 grams and dosage forms suitable for internal administration comprise from about 62.5 milligrams to about 1000 milligrams of the compound admixed with a solid or liquid pharmaceutical carrier or diluent.

A representative formulation is a tablet (prepared by standard tabletting techniques) and containing the following ingredients.

Ingredients: Parts by wt.
1 - [p - {2 - [α,α - bis(p-chlorophenoxy)acetamido]ethyl}phenylsulfonyl] - 3 - cyclohexylurea _____ 50
Tragacanth _____ 2
Lactose _____ 39.5
Corn starch _____ 5
Talcum _____ 3
Magnesium stearate _____ 0.5

The following example shows a representative compound encompassed within the scope of this invention and the manner in which such compound is prepared. However, it is to be understood that the example is for purposes of illustration only and is not intended as in any way limiting the scope of the invention which is defined in the appended claims.

EXAMPLE

1-[p-{2-[α,α-bis(p-chlorophenoxy) acetamido]ethyl}phenylsulfonyl]-3-cyclohexylurea

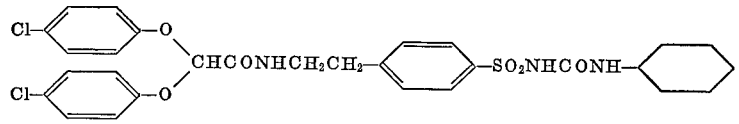

Step A.—Preparation of p-{2-[α,α-bis(p-chlorophenoxy) acetamido]ethyl}benzenesulfonamide A mixture of 33 g. (0.1 mole) of bis-(p-chlorophenoxy) acetic acid methyl ester and 20 g. (0.1 mole) of p-(β-aminoethyl)benzenesulfonamide is heated to 150° C. and then the reaction temperature is maintained at 150–160° C. for an additional hour. The heat is then removed and water aspirator vacuum applied for 15 minutes. To the resulting viscous material (previously cooled) is added 100 ml. of cold (5° C.) low-boiling petroleum ether, the resulting mixture filtered and the solids washed with petroleum ether to obtain p-{2-[α,α-bis(p-chlorophenoxy) acetamido]ethyl}benzenesulfonamide, M.P. 131–138° C.

Step B.—Preparation of 1-[p-{2-[α,α-bis(p-chlorophenoxy)acetamido]ethyl}phenylsulfonyl]-3-cyclohexylurea To a mixture of 32 g. (0.065 mole) of p{2-[α·α-bis(p-chlorophenoxy)acetamido] ethyl} benzenesulfonamide, 160 ml. of acetone and 160 ml. of water is added with stirring 3.5 ml. of 50% sodium hydroxide. The resulting solution is cooled to 5° C. and then 8 g. of cyclohexyl isocyanate is added over a period of 5 minutes. The resulting mixture is stirred for 4 hours, then allowed to stand overnight at room temperature and then refluxed for 2 hours. The resulting mixture is cooled to 20° C. and made acidic by the addition of 7 ml. of hydrochloric acid while maintaining the temperature of the reaction mixture at about 20° C. The acidic mixture is then stirred and cooled to 5° C. and the solids filtered off and washed with low-boiling petroleum ether. The washed solids are dissolved in 100 ml. of acetone and the resulting solution refluxed for 30 minutes in the presence of 5 g. of charcoal, filtered hot and the charcoal washed with 200 ml. of hot acetone. To the combined filtrate and wash is added 120 ml. of water and the resulting mixture cooled to 5° C., filtered and the solids washed with 100 ml. of cold 50% aqueous acetone and then dried. The dried solids are refluxed with 100 ml. of toluene and 100 ml. of acetone for 30 minutes and then 5 g. of Celite is added and the mixture filtered through a Celite mat. The filtrate is atmospherically distilled until the temperature of the mixture reaches 78° C., then cooled slowly to 5° C., filtered and the solids washed with cold toluene, then with low-boiling petroleum ether and then dried to obtain 1 - [p - {2 - [α,α - bis(p - chlorophenoxy)acetamido] ethyl}phenylsulfonyl] - 3 - cyclohexylurea, M.P. 153–157° C.

What is claimed is:

1. A compound selected from the group consisting of benzenesulfonyl ureas of the formula

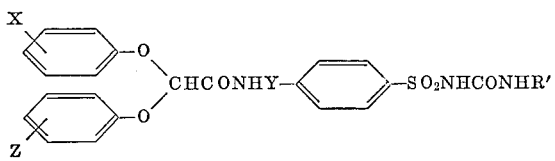

and salts thereof from non-toxic alkali metal and alkali earth metal bases:

wherein
- X is halo;
- Z is halo;
- Y represents alkylene having from 1 to 3 carbon atoms; and
- R' represents lower alkyl, cycloalkyl having from 5 to 8 ring carbon atoms, or lower alkylcycloalkyl having from 5 to 8 ring carbon atoms.

2. A compound of claim 1 wherein X is halo having an atomic weight of from 35 to 80, Z is halo having an atomic weight of from 35 to 80, and Y and R' are as defined in claim 1.

3. A compound of claim 1 wherein each of X and Z is p-chloro and Y and R' are as defined in claim 1.

4. A compound of claim 1 wherein each of X and Z is p-chloro, Y is ethylene and R' is cycloalkyl having from 5 to 8 carbon atoms.

5. The compound of claim 1 which is 1-[p-{2-[α,α-bis(p - chlorophenoxy)acetamido]ethyl}phenylsulfonyl]-3-cyclohexylurea.

References Cited

UNITED STATES PATENTS 3,426,067  2/1969  Weber et al. _____ 260—553

OTHER REFERENCES

Morrison et al. "Organic Chemistry" p. 635 (1959).
Wagner et al. "Synthetic Organic Chemistry" p. 172 (1965).

BERNARD HELFIN, Primary Examiner

G. A. SCHWARTZ, Assistant Examiner

U.S. Cl. X.R.

260—556 AR; 424—322